(12) United States Patent
Fuccello et al.

(10) Patent No.: US 7,715,793 B2
(45) Date of Patent: May 11, 2010

(54) SYSTEM AND METHOD FOR ESTABLISHING A WIRELESS CONNECTION BETWEEN WIRELESS DEVICES

(75) Inventors: James R. Fuccello, Patchogue, NY (US); Taheer Khazi, Central Islip, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 923 days.

(21) Appl. No.: 11/513,470

(22) Filed: Aug. 31, 2006

(65) Prior Publication Data

US 2008/0057990 A1 Mar. 6, 2008

(51) Int. Cl.
*H04B 7/00* (2006.01)
(52) U.S. Cl. .................. 455/41.2; 455/556.1; 455/502; 455/507; 455/557; 455/466; 455/556.2; 455/564; 370/349; 370/350; 370/338; 370/469; 370/471; 375/132; 375/356
(58) Field of Classification Search ................ 455/41.2, 455/557, 556.1, 564, 556.2, 466, 502, 507; 370/349, 350, 469, 471, 401, 463, 338; 705/26
See application file for complete search history.

(56) References Cited

U.S. PATENT DOCUMENTS

| | | | |
|---|---|---|---|
| 7,039,033 B2 * | 5/2006 | Haller et al. ................. | 370/338 |
| 7,039,358 B1 * | 5/2006 | Shellhammer et al. ...... | 455/41.2 |
| 7,215,649 B2 * | 5/2007 | Yu et al. ...................... | 370/313 |
| 7,280,836 B2 * | 10/2007 | Fuccello et al. ........... | 455/452.1 |
| 7,373,109 B2 * | 5/2008 | Pohja et al. ................. | 455/41.2 |
| 7,487,112 B2 * | 2/2009 | Barnes, Jr. ................... | 705/26 |
| 7,546,144 B2 * | 6/2009 | de Leon et al. ............. | 455/557 |
| 7,551,590 B2 * | 6/2009 | Haller et al. ................ | 370/338 |
| 2007/0224936 A1 * | 9/2007 | Desai ......................... | 455/41.2 |
| 2007/0274273 A1 * | 11/2007 | Grushkevich et al. ....... | 370/338 |
| 2008/0125037 A1 * | 5/2008 | Ibrahim et al. ............. | 455/41.2 |

\* cited by examiner

*Primary Examiner*—Marceau Milord

(57) ABSTRACT

Described is a system and method for establishing a wireless connection between wireless devices. The method comprises obtaining data of a corresponding computing device. The device conducts wireless communications using a predetermined wireless protocol. The obtained data is processed to generate a wireless address of the device and a first message is transmitted to the device for establishing a wireless connection. The first message is addressed to the wireless address. When a first response message is received from the device, a second message is transmitted to the device. The first response message is generated in response to the first message and includes the wireless address. The second message includes synchronization data. When a second response message is received from the device, the wireless connection is established with the device. The second response message is generated in response to the second message.

21 Claims, 3 Drawing Sheets

SYSTEM AND METHOD FOR ESTABLISHING A WIRELESS CONNECTION BETWEEN WIRELESS DEVICES

FIELD OF THE INVENTION

The present invention relates generally to systems and methods for establishing a wireless connection between wireless devices.

BACKGROUND

In conventional wireless systems, a first wireless device establishes a wireless connection with a second wireless device by transmitting a request to connect and executing a connection handshake. For example, according to the Bluetooth® protocol, the first device broadcasts an inquiry, and, if the second device hears the inquiry, it transmits a response to the first device with its Bluetooth address. However, the second device may require that the first device be authenticated before establishing the connection. An authentication handshake, in addition to the inquiry, may prolong the connection between the first and second devices. Thus, there is a need to establish the wireless connection between the first and second devices more efficiently.

SUMMARY OF THE INVENTION

The present invention relates to a system and method for establishing a wireless connection between wireless devices. The method comprises obtaining data of a corresponding computing device. The device conducts wireless communications using a predetermined wireless protocol. The obtained data is processed to generate a wireless address of the device and a first message is transmitted to the device for establishing a wireless connection. The first message is addressed to the wireless address. When a first response message is received from the device, a second message is transmitted to the device. The first response message is generated in response to the first message and includes the wireless address. The second message includes synchronization data. When a second response message is received from the device, the wireless connection is established with the device. The second response message is generated in response to the second message.

DETAILED DESCRIPTION

Figure 1:
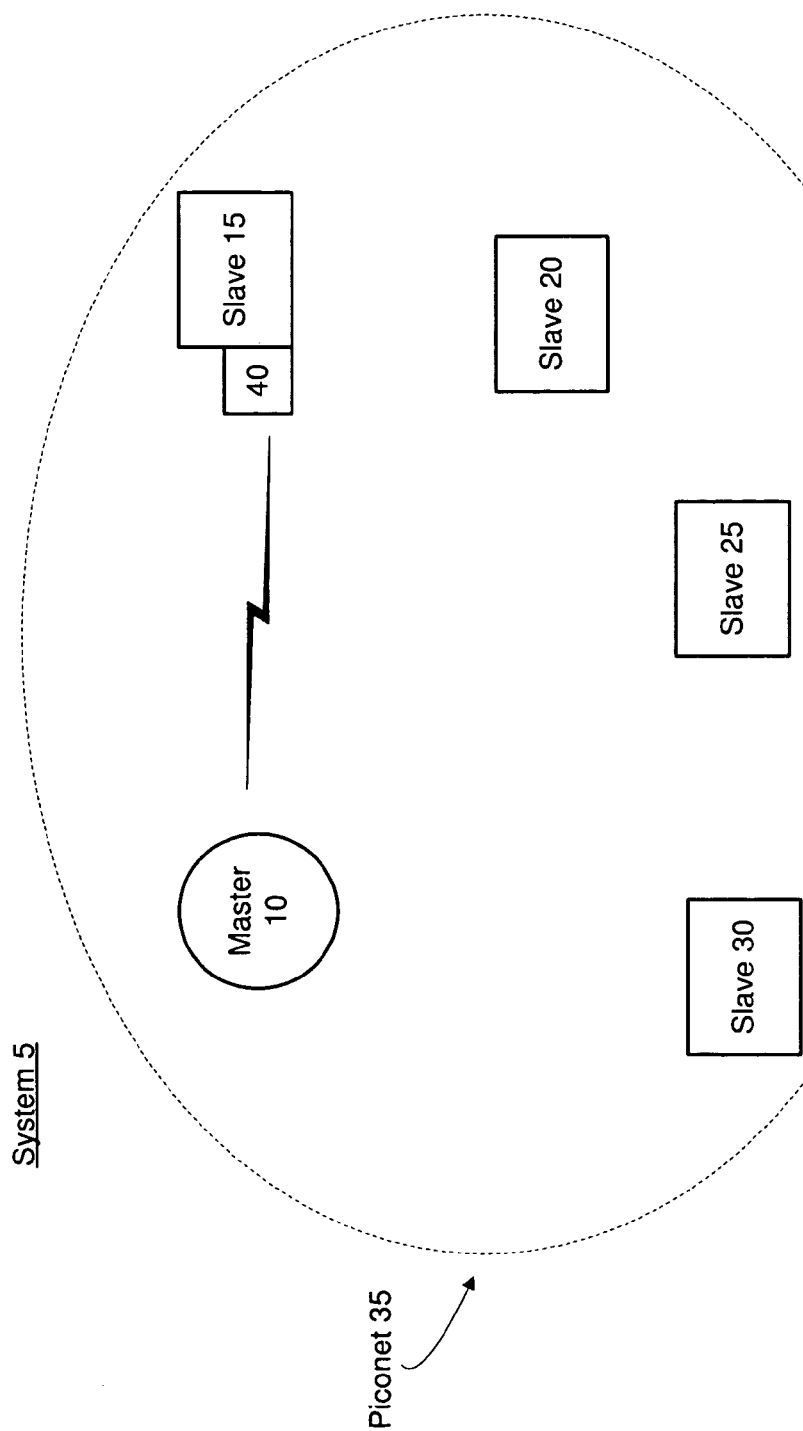
FIG. 1 shows an exemplary embodiment of a system for establishing a wireless connection between wireless devices according to the present invention.

The present invention may be further understood with reference to the following description and the appended drawings, wherein like elements are referred to with the same reference numerals. The present invention describes a system and method for establishing a wireless connection between wireless devices. While the exemplary embodiments of the present invention will be described with reference to a Bluetooth protocol used for wireless communications by the wireless devices, those of skill in the art will understand that the present invention may be implemented by any wireless communication mechanism/protocol used by the wireless devices, such as, for example, IEEE 802.1x, RFID, infrared and UWB. In addition, the wireless devices may utilize only the Bluetooth protocol for wireless communications or utilize the Bluetooth protocol in conjunction with at least one of the other wireless protocols described herein or known in the art.

FIG. 1 shows an exemplary embodiment of a system 5 for establishing a wireless connection between wireless devices. The system 5 includes a master device 10 and at least one slave device (e.g., slave devices 15-30) which are each equipped with a radio transceiver configured to conduct wireless communications according to the Bluetooth protocol. As stated above, the devices may be configured for wireless communications according to other wireless protocols, e.g., 802.1x, RFID, infrared, UWB, etc. In the exemplary embodiment, the master device 10 is a mobile computing device (e.g., includes a bar code scanner, mobile phone, PDA, tablet computer, a laptop, digital camera, digital media player, a network interface card, etc.) which includes an advanced data capture arrangement (e.g., a laser-based scanner, an imager-based scanner, an RFID reader). The slave devices 15-30, in the exemplary embodiment of the present invention, are peripheral computing devices (e.g., printers, headsets, keyboards, mice, digital pens, scanners, etc.). Those of skill in the art will understand that any of the exemplary master devices may also operate as a slave device when communicating with a further master device. As understood by those of skill in the art, a communications network formed when the master device 10 establishes a wireless connection with at least one of the slave devices 15-30 is referred to as a piconet 35, or wireless personal area network (WPAN).

The Bluetooth protocol provides for wireless communications on a 2.4 GHz frequency band at data rates approximately equal to 1 Mbps. To avoid interference with other wireless communications on the 2.4 GHz frequency band (e.g., 802.11b/g signals), the Bluetooth protocol utilizes a low transmission power (~1 mW) and further employs a frequency hopping spread spectrum (FHSS) sequence at a frequency hop rate of 1600 hops/second. The master device 10 and the slave devices use the FHSS sequence to synchronize communications with each other in a round-robin fashion. As is known in the art, a Bluetooth master device (e.g., the master device 10) may communicate with up to seven active slave devices. For example, the master device 10 may be a bar code scanner which is wirelessly connected to two slave devices: a head set and a printer.

The Bluetooth protocol stack comprises several layers: a Service Discovery Protocol (SDP) layer, a Serial Cable Emulation Protocol (RFCOMM) layer, a Logical Link Control and Adaptation Protocol (L2CAP) layer and a Host Controller Interface (HCI) layer. The SDP layer is a Bluetooth service discovery protocol that handles publishing and discovery of services running on top of the Bluetooth protocol stack. The RFCOMM layer is an adaptation protocol that serves as a base for COM port emulation facilities and derived point-to-point protocols. Multiplexing and flow control between devices and applications are implemented on the RFCOMM layer. The L2CAP layer is a lower connection-based Bluetooth communication protocol that implements multiplexing, but not flow control. The L2CAP layer relies on a reliable device-to-device baseband link by Bluetooth hardware. The HCI layer is a basic interface to the Bluetooth hardware which is responsible for controller management, link establishment and maintenance.

In a conventional Bluetooth system, a master device enters an inquiry mode and broadcasts an inquiry to identify Bluetooth devices within its communicative range. Each Bluetooth device receiving the inquiry transmits a response message including its Bluetooth address, i.e., a 48-bit unique identifier, to the master device. As known by those of skill in the art, the Bluetooth address may be displayed on the master device, in addition to, for example, a friendly name (alias), a manufacturer, a model number, etc. Thus, a user of the master device can readily identify the Bluetooth device (which would otherwise be difficult when viewing the 48-bit identifier). The response message further includes a clock offset for the Bluetooth device. In addition, when more than one Bluetooth device responds to the inquiry, each of the response messages is transmitted in a different slot to avoid interference.

When the master device has the Bluetooth address of the Bluetooth device and desires to establish a connection with the Bluetooth device (as selected manually by a user or automatically upon reception of the Bluetooth address), the master device enters a page mode and transmits a page message (including the Bluetooth address) to the Bluetooth device. The Bluetooth device responds by transmitting a page response including its Bluetooth address. The master device then transmits its Bluetooth address and clock offset so the Bluetooth device can synchronize its clock and FHSS sequence with the master device's clock and FHSS sequence. The master device is then connected to the Bluetooth device, which switches into an active mode.

In the conventional Bluetooth system, a large number of Bluetooth devices may be within the communicative range of the master device and respond to the inquiry message. To identify the Bluetooth addresses of each of these devices may take a significant time period. In the exemplary embodiments of the present invention, the master device obtains the Bluetooth address of the Bluetooth device with which it desires a connection before initiating the inquiry, decreasing a connection time with the Bluetooth device and allowing the master device to connect to the Bluetooth device regardless of whether it is connected to any further device.

As described above, the master device 10 includes the advanced data captured arrangement for capturing data. In the exemplary embodiment, each of the slave devices 15-30 includes a unique bar code coupled thereto which includes data identifying the slave device 15-30 and, optionally, other information related thereto. For example, as shown in FIG. 1, the slave device 15 has a bar code 40 coupled thereto. When scanned by the master device 10, bar code data is generated which includes the Bluetooth address of the slave device 15. Because the master device 10 has knowledge of the Bluetooth address of the slave device 15, the master device 10 may bypass the inquiry mode and switch directly to the paging mode to establish a wireless connection with the slave device 15. In an alternative exemplary embodiment, the Bluetooth address of the slave device 15 may be stored on an RFID tag coupled to the slave device 15. In this embodiment, the master device 10 utilizes an RFID reader to read the Bluetooth address on the RFID tag.

Figure 3:
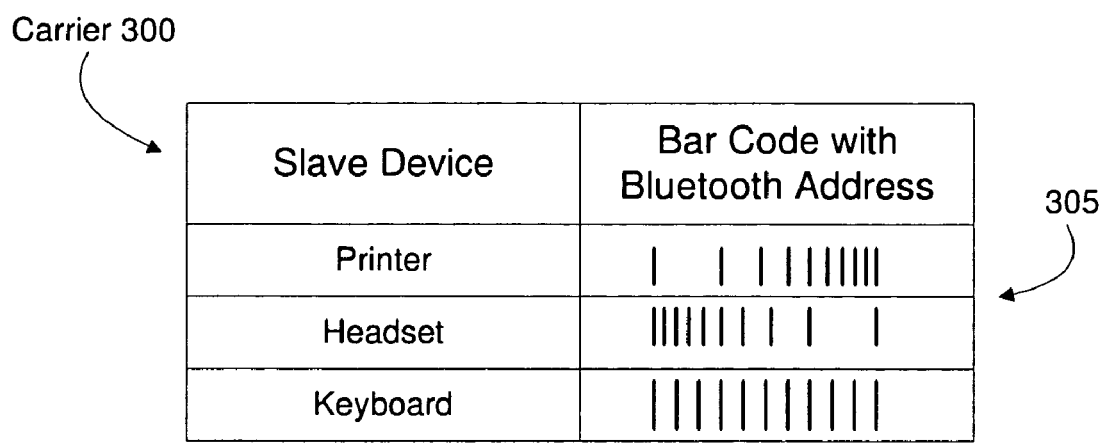
FIG. 3 shows an exemplary embodiment of a carrier used for establishing a wireless connection between wireless devices according to the present invention.

FIG. 3 shows a further exemplary embodiment of the present invention in which the bar code 40 is one of a plurality of bar codes imprinted on a carrier 300. The plurality of bar codes corresponds to the Bluetooth addresses of respective slave devices. In this embodiment, the user of the master device 10 may simply scan the bar codes of the slave devices whose services may be required during use of the master device 10. For example, the bar codes corresponding to a Bluetooth printer and Bluetooth headset may be scanned by the master device 10 to establish connections therewith. This exemplary embodiment may allow the user to initiate connections with one or more slave devices without being in a scanning range thereof. That is, as is known in the art, the scanning range may be significantly less than a communicative range between the master device 10 and the slave device(s).

When the master device 10 acquires the Bluetooth address, it enters the paging mode and transmits a page message with the Bluetooth address to the slave device 15. At this point, the slave device 15 is using its own FHSS sequence which may differ from the FHSS sequence used by the master device 10. However, due to the frequency hop rate defined in the Bluetooth protocol, the slave device 15 is likely to hear the page message on at least one of the frequencies. Upon hearing the page message, the slave device 15 transmits a page response including its Bluetooth address. The master device 10 may compare the Bluetooth address in the page response to the Bluetooth address in the page message to ensure that the correct slave device 15 has responded. Upon receipt of the page response, the master device 10 transmits a synchronization message including synchronization data (e.g., its clock offset and FHSS sequence) to the slave device 15. The slave device 15 uses the synchronization data to support the connection with the master device 10 and transmits a confirmation message (including its Bluetooth address) to the master device 10.

In another exemplary embodiment, the slave device 15 may request authentication of the master device 10 before establishing the connection therewith. In this embodiment, the bar code 40 may further include an authentication code (e.g., a PIN code) required by the slave device 15 for connecting thereto. The slave device 15, in the page response for example, transmits a PIN code request to the master device 10. Conventionally, the user of the master device 10 would be required to enter the PIN code manually to complete the authentication. However, according to the exemplary embodiments of the present invention, the PIN code is obtained from the scan of the bar code 40, and, as a result, is automatically provided in the synchronization message to the slave device 15. That is, upon receiving the page response, the master device 10 may look-up the PIN code (in a memory) as a function of the Bluetooth address of the slave device 15. The automatic authentication may reduce the time it takes to establish the connection between the master device 10 and the slave device 15.

In addition, the authentication code may be utilized to encrypt wireless communications between the master device 10 and the slave device 15. The authentication code, because it is known by both devices, may be used to generate an encryption key for encrypting (and decrypting on a receiving side) the wireless communications.

Figure 2:
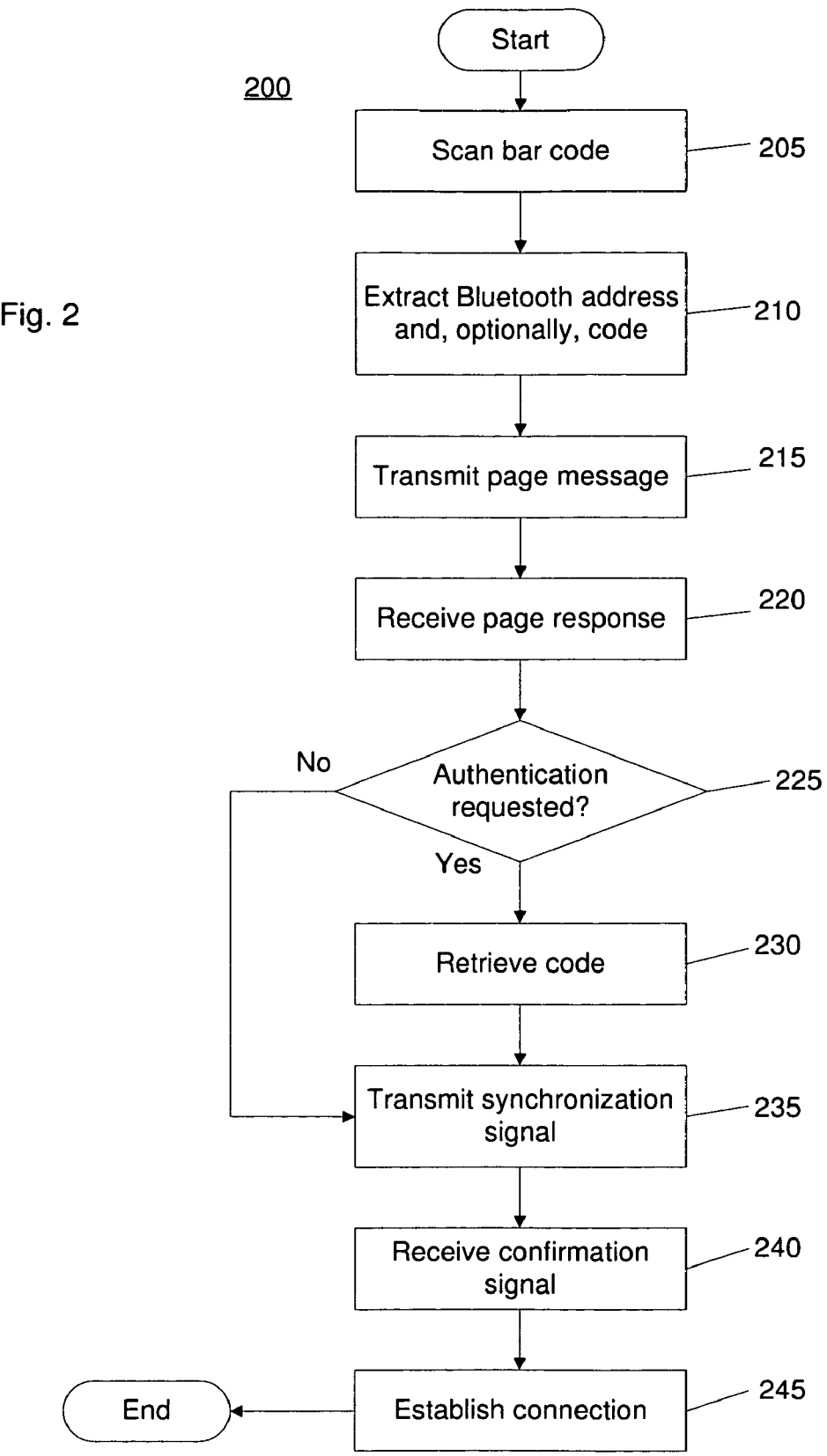
FIG. 2 shows an exemplary embodiment of a method for establishing a wireless connection between wireless devices according to the present invention.

FIG. 2 shows an exemplary embodiment of a method 200 for establishing a wireless connection between wireless devices according to the present invention. In step 205, the master device 10 scans the bar code 40 on the slave device 15. As noted above, RFID technology or any other decodable indicia (e.g, text, images, etc.) may be utilized, and the bar code 40 may be imprinted on the carrier 300 or another suitable item. In step 210, the Bluetooth address and, optionally, the code, are extracted from the bar code data generated from the scan of the bar code 40.

In step 215, the master device 10 transmits the page message to the device (e.g., the slave device 15) indicated by the Bluetooth address. In step 220, the master device 10 receives a page response from the slave device 15, because, as noted above, a Bluetooth device that receives a page response with its Bluetooth address must respond.

In step 225, the master device 10 analyzes the page response to determine whether the slave device 15 has requested authentication. In step 230, because authentication was requested, the master device 10 obtains an authentication code corresponding to the slave device 15. As noted above, the authentication code may be included in the bar code data or may be obtained manually from the user of the master device 10.

In step 235, the master device 10 transmits the synchronization message to the slave device 15. The synchronization message includes the synchronization data (e.g., the clock offset of the master device 10 and the FHSS sequence used by the master device 10). If the slave device 15 has requested authentication of the master device 10, the synchronization message may further include the authentication code. As noted above, the slave device 15, upon receipt (and, optionally authentication) of the synchronization message, transmits the confirmation message to the master device 10.

In step 240, the master device 10 receives the confirmation message from the slave device 15, and establishes a connection with the slave device 15, as shown in step 245. As known by those of skill in the art, the master device 10 may support connections with up to seven Bluetooth slave devices at a single time.

According to the exemplary embodiments of the present invention, the master device 10 knows the Bluetooth address of the slave device 15 and, as such, may configure the slave device 15 as "non-discoverable." This may enhance security of the slave device 15 since only the master device 10 has knowledge of the Bluetooth address of the slave device 15.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   obtaining data of at least one peripheral device, the peripheral device conducting wireless communications using a predetermined wireless protocol;
   processing the obtained data to generate a wireless address of the peripheral device;
   transmitting a first message to the peripheral device for establishing a wireless connection, the first message being addressed to the wireless address;
   when a first response message is received from the peripheral device, transmitting a second message to the peripheral device, the first response message being generated in response to the first message and including the wireless address, the second message including synchronization data, the synchronization data including a clock offset and a frequency hopping sequence employed by a mobile computing device for use by the peripheral device; and
   when a second response message is received from the peripheral device, establishing the wireless connection with the peripheral device, the second response message being generated in response to the second message.

2. The method according to claim 1, wherein the obtaining step includes one of the following substeps:
   scanning a bar code containing the wireless address; and
   reading an RFID tag containing the wireless address.

3. The method according to claim 1, further comprising:
   processing the obtained data to generate an authentication code for use in establishing the wireless connection.

4. The method according to claim 3, wherein one of the first and second response messages includes an authentication request from the second device.

5. The method according to claim 4, wherein one of the second message and a third message includes the authentication code.

6. The method according to claim 1, wherein the predetermined wireless protocol is one of IEE 802.11, IEEE 802.16, infrared, Bluetooth and UWB.

7. The method according to claim 1, wherein the computing device is one of a headset, a printer, a digital pen, a scanner, a keyboard and a mouse.

8. The method according to claim 1, wherein the synchronization data includes at least one of a clock offset and a frequency hopping sequence.

9. The method according to claim 1, further comprising:
   configuring the device as non-discoverable.

10. A system, comprising:
    a first wireless device; and
    a second wireless device,
    wherein the first and second devices conduct wireless communications using a predetermined wireless protocol,
    wherein the first device obtains data corresponding to the second device and processes the obtained data to generate a wireless address of the second device, the first device transmitting a first message to the wireless address for establishing a wireless connection with the second device,
    wherein, when a first response message is received by the first device from the second device, the first device transmits a second message to the second device, the first response message being generated in response to the first message and including the wireless address of the second device, the second message including synchronization data to facilitate the wireless communications between the first and second devices, the synchronization data including a clock offset and a frequency hopping sequence employed by the first wireless device for use by the second wireless device, and
    wherein, when a second response message is received by the first device from the second device, the wireless connection between the first and second devices is established, the second response message being generated in response to the second message.

11. The system according to claim 10, wherein the first device includes at least one of a laser-based scanner, an imager-based scanner, an RFID reader, a mobile phone, a PDA and a tablet computer.

12. The system according to claim 10, wherein the second device is one of a headset, a printer, a digital pen, a scanner, a keyboard and a mouse.

13. The system according to claim 10, wherein the first device obtains the wireless address by one of (i) scanning a bar code containing the wireless address and (ii) reading an RFID tag containing the wireless address.

14. The system according to claim 13, wherein one of the bar code and the RFID tag are located on the computing device.

15. The system according to claim 10, wherein the synchronization data includes at least one of a clock offset and a frequency hopping sequence of the first device.

16. A device, comprising:
    a data capture arrangement obtaining data of a wireless device;

a wireless communications arrangement conducting wireless communications using a predetermined wireless protocol; and a processor processing the obtained data to generate a wireless address of the wireless device, the processor transmitting, via the communications arrangement, a first message to the wireless device for establishing a wireless connection therewith, the first message being addressed to the wireless address, wherein, when a first response message is received from the wireless device, the processor transmits, via the communications arrangement, a second message to the wireless device, the first response message being generated in response to the first message and including the wireless address, the second message including synchronization data, the synchronization data including a clock offset and a frequency hopping sequence employed by the wireless communication arrangement for use by the wireless device and wherein, when a second response message is received from the wireless device, the processor establishes the wireless connection with the wireless device, the second response message being generated in response to the second message.

17. The device according to claim 16, wherein the data capture arrangement includes at least one of a laser-based scanner, an imager-based scanner and an RFID reader.

18. The device according to claim 16, wherein the wireless device is one of a headset, a printer, a digital pen, a scanner, a keyboard and a mouse.

19. The device according to claim 16, wherein the device obtains the wireless address by one of (i) scanning a bar code containing the wireless address and (ii) reading an RFID tag containing the wireless address.

20. The device according to claim 16, wherein the synchronization data includes at least one of a clock offset and a frequency hopping sequence of the device.

21. A device, comprising:
a data capture means for obtaining data of a wireless device;
a wireless communications means for conducting wireless communications using a predetermined wireless protocol; and
a processing means for processing the obtained data to generate a wireless address of the wireless device, the processing means transmitting, via the communications means, a first message to the wireless device for establishing a wireless connection therewith, the first message being addressed to the wireless address,
wherein, when a first response message is received from the wireless device, the processing means transmits, via the communications means, a second message to the wireless device, the first response message being generated in response to the first message and including the wireless address, the second message including synchronization data, the synchronization data including a clock offset and a frequency hopping sequence employed by the wireless communication means for use by the wireless device, and
wherein, when a second response message is received from the wireless device, the processing means establishes the wireless connection with the wireless device, the second response message being generated in response to the second message.

* * * * *